No. 717,030. Patented Dec. 30, 1902.
C. A. SAGER.
GRASS EDGE TRIMMER AND SOD CUTTER.
(Application filed Sept. 16, 1902.)

(No Model.)

WITNESSES
Chas. L. Hyde.
Nina B. West.

INVENTOR
Chauncy A. Sager.
BY Hazard & Harpham.
ATTORNEYS

UNITED STATES PATENT OFFICE.

CHAUNCY A. SAGER, OF LOS ANGELES, CALIFORNIA.

GRASS-EDGE TRIMMER AND SOD-CUTTER.

SPECIFICATION forming part of Letters Patent No. 717,030, dated December 30, 1902.

Application filed September 16, 1902. Serial No. 123,612. (No model.)

*To all whom it may concern:*

Be it known that I, CHAUNCY A. SAGER, a citizen of the United States, residing at Los Angeles, in the county of Los Angeles and State of California, have invented a new and useful Grass-Edge Trimmer and Sod-Cutter, of which the following is a specification.

My invention relates more particularly to means to cut grass along the edges of lawns, but may be used to cut sod when desired; and the object of my invention is to provide a simple and reliable device therefor, and I accomplish these ends by means of the device herein described, and shown in the accompanying drawings, in which—

Figure 1:
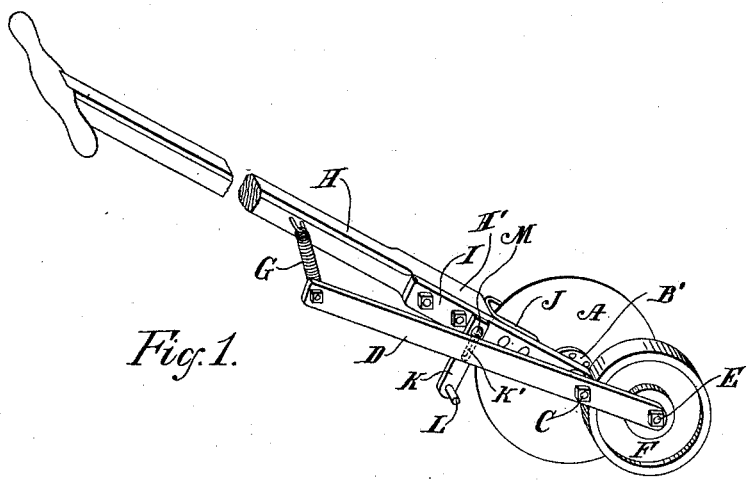
Figure 2:
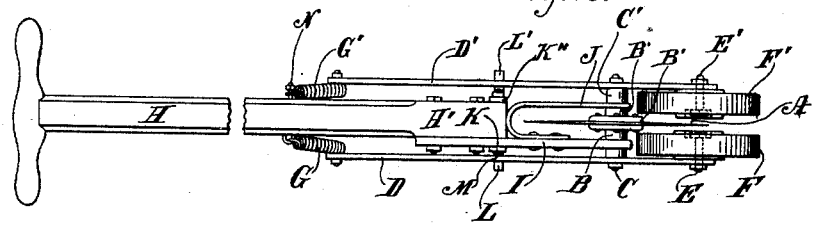

Figure 1 is a perspective side elevation of my edge-trimmer and sod-cutter, part of the handle being broken away. Fig 2 is a plan thereof with an extra tread-wheel secured thereto.

In the drawings, A represents a circular sharp-edged cutting-disk securely bolted to the flanges B' on the hub B, the hub being mounted on the axle C. This axle is journaled in the flat bar I and the bar J, partly bent upon itself, the bar I being bolted to the handle-bar H, as shown, and the bar J being securely bolted to bar I. An arm D is pivotally mounted on an extension of the axle C. The forwardly-projecting end forms a support for the axle E, on which the grass-treading wheel F is rotatively mounted. This arm D projects rearwardly from the axle C to a point where it is secured to a spiral spring G, the spring being secured at its other end to the handle. The grass-treading wheel F has considerable width in its tread to enable it to satisfactorily crowd the grass down and prevent the wheel from being pressed below the surface when any extra pressure is placed thereon. It is mounted in advance of the cutting-wheel, so that the grass will be crowded down to the lowest point, where the edge of the cutting-wheel begins to cut down into the sod, and thereby catch and cut all the grass pressed down by the treading-wheel, which projects beyond the edge thereof and toward the cutting-wheel, the cutting-wheel being always on the side next to the border of the lawn.

The arm D, which carries the grass-tread wheel, has an oscillating movement on the axle C, where it is mounted, the purpose of which is to permit the tread-wheel to have an up-and-down movement over and along uneven surfaces or rocks which may be on the lawn without moving the cutting-wheel up and down at the same time, enabling the operator to keep the edge of the cutter close to the surface and at the same time not jump out of the ground when the tread-wheel jumps up or is elevated by any of these elevations.

The object of attaching the end of the arm D to the spring G is to facilitate the movement just described and to hold the tread-wheel in its normal position when cutting along surfaces which present normal conditions. The depth at which the cutter will be permitted to enter the ground can be regulated by the regulating-arm K, carrying regulating-boss L, mounted on the lower end of the regulating-arm. The elevation of this boss is regulated by the securing-bolt M, which passes through the longitudinal slot K' in the regulating-arm K, enabling the operator to put the boss at any desired elevation, so as to properly regulate the position of the tread-wheel to the cutter-wheel, the differences required growing out of the different depths which it is desired to cut, owing to the varying conditions of the various lawns operated on.

The device may be weighted by placing on the upper face of the butt-end H' of the handle a receptacle, such as a tin can, to hold any substance placed therein, or a weight may be used, the purpose being to cause the cutting-disk to uniformly cut grass where it is thick or coarse or for any cause cut with difficulty, the receptacle or weight being secured to the butt of the handle by suitable connecting means.

Having described my invention, what I claim as new, and desire to secure by Letters Patent, is—

1. A device to trim the edges of lawns, comprising a handle; a circular cutting-disk revolubly mounted in bearings secured to the handle; a tread-wheel revolubly mounted in advance of the cutting-disk on a pivoted arm; an arm to carry the tread-wheel, the said arm pivotally mounted on the axle of the cutting-disk and extending back to and connected with a coiled spring; a coiled spring on the handle and connecting same with pivoted arm and means to adjust the pressure on said spring.

2. A lawn-edge trimmer and sod-cutter, comprising a handle; a circular cutting-disk revolubly mounted thereon; a tread-wheel revolubly mounted on a pivoted arm, the said tread-wheel being mounted in advance of the cutting-disk on the forward end of the arm; a pivoted arm to carry the tread-wheel pivotally mounted in the axle of the cutting-disk, the rear end of the arm being secured to the handle by a spiral spring; said spiral spring secured to the handle at one end and to the arm at the other end and means substantially as described to adjust the position of the tread-wheel to the cutter-disk substantially as shown and described.

3. The herein-described device to trim the edges of lawns and to cut sod, comprising an operating-handle H; a circular cutting-disk A revolubly mounted thereon; a tread-wheel F, the said tread-wheel having adjustable means comprising the arm D pivotally mounted on the axle C on which it is revolubly mounted, the said arm and the spring G forming a resilient connection between the arm and the handle, the adjusting-arm K having adjusting-slot K' therein and the adjusting-boss L, and the bolt M to adjustably secure the adjusting-arm K to the handle.

In witness that I claim the foregoing I have hereunto subscribed my name this 30th day of August, 1902.

CHAUNCY A. SAGER.

Witnesses:
HENRY T. HAZARD,
G. E. HARPHAM.